(12) United States Patent
Lin et al.

(10) Patent No.: US 10,933,945 B2
(45) Date of Patent: Mar. 2, 2021

(54) HUB APPARATUS AND ASSOCIATED SYSTEMS

(71) Applicant: Gogoro Inc., Hong Kong (CN)

(72) Inventors: Shih-Yuan Lin, Taipei (TW); Hsin-Wen Su, Taipei (TW); Hok-Sum Horace Luke, Mercer Island, WA (US); Chen-Hsin Hsu, New Taipei (TW)

(73) Assignee: Gogoro Inc., Hong Kong (CN)

( * ) Notice: Subject to any disclaimer, the term of this patent is extended or adjusted under 35 U.S.C. 154(b) by 76 days.

(21) Appl. No.: 16/207,044

(22) Filed: Nov. 30, 2018

(65) Prior Publication Data

US 2019/0202526 A1 Jul. 4, 2019

Related U.S. Application Data

(60) Provisional application No. 62/593,854, filed on Dec. 1, 2017, provisional application No. 62/650,895, filed on Mar. 30, 2018.

(51) Int. Cl.
*B62M 6/60* (2010.01)
*B62M 6/50* (2010.01)
(Continued)

(52) U.S. Cl.
CPC .............. *B62M 6/60* (2013.01); *B60B 1/003* (2013.01); *B60B 27/04* (2013.01); *B60L 50/20* (2019.02);
(Continued)

(58) Field of Classification Search
CPC . B62M 6/60; B62M 6/50; B62M 6/65; B62M 6/90; B60L 53/12; B60L 53/305;
(Continued)

(56) References Cited

U.S. PATENT DOCUMENTS 502,500 A * 8/1893 Perkins .................. B60B 1/044
301/58
748,684 A * 1/1904 Anderson et al. ...... B60B 1/042
301/58
(Continued)

FOREIGN PATENT DOCUMENTS

FR       1083341 A    1/1955
JP    2006021765 A    1/2006
(Continued)

OTHER PUBLICATIONS

Office Action received for co-pending Taiwanese Application No. 107143125; Applicant: Gogoro Inc., dated Sep. 25, 2019, 7 pages.
(Continued)

*Primary Examiner* — Jacob B Meyer
(74) *Attorney, Agent, or Firm* — Perkins Coie LLP

(57) ABSTRACT

The present disclosure relates to structures and associated systems for connecting a hub apparatus to a wheel. In some embodiments, the hub apparatus includes (1) a housing assembly having an outer radius; and (2) a mounting portion circumferentially provided on at least one side surface of the housing assembly. The mounting portion is formed with a plurality of coupling structures configured to couple the hub apparatus to a wheel rim. The mounting portion defines a first radius smaller than the outer radius.

18 Claims, 5 Drawing Sheets

(51) Int. Cl.
*H02K 7/00* (2006.01)
*H02K 5/10* (2006.01)
*H02K 7/12* (2006.01)
*H02K 11/00* (2016.01)
*H02K 21/22* (2006.01)
*B62M 6/65* (2010.01)
*B62M 6/90* (2010.01)
*B60B 1/00* (2006.01)
*H02K 11/24* (2016.01)
*B60L 50/20* (2019.01)
*B60L 50/60* (2019.01)
*B60B 27/04* (2006.01)
*H02K 11/33* (2016.01)
*B60L 53/16* (2019.01)
*H02K 1/18* (2006.01)
*B60L 53/12* (2019.01)
*B60L 53/30* (2019.01)
*H02K 1/27* (2006.01)
*H02K 11/30* (2016.01)
*B60B 1/04* (2006.01)
*H02K 7/14* (2006.01)

(52) U.S. Cl.
CPC ............ *B60L 50/60* (2019.02); *B60L 50/66* (2019.02); *B60L 53/12* (2019.02); *B60L 53/16* (2019.02); *B60L 53/305* (2019.02); *B62M 6/50* (2013.01); *B62M 6/65* (2013.01); *B62M 6/90* (2013.01); *H02K 1/187* (2013.01); *H02K 5/10* (2013.01); *H02K 7/006* (2013.01); *H02K 7/12* (2013.01); *H02K 11/0094* (2013.01); *H02K 11/24* (2016.01); *H02K 11/33* (2016.01); *H02K 21/22* (2013.01); *B60B 1/042* (2013.01); *B60L 2200/12* (2013.01); *B60L 2220/44* (2013.01); *B60L 2240/42* (2013.01); *H02K 1/2786* (2013.01); *H02K 7/14* (2013.01); *H02K 11/30* (2016.01); *H02K 2211/03* (2013.01)

(58) Field of Classification Search
CPC .......... B60L 50/60; B60L 53/16; B60L 50/20; B60L 50/66; B60L 2220/44; B60L 2200/12; B60L 2240/42; B60B 27/04; B60B 1/003; B60B 1/042; H02K 11/33; H02K 1/187; H02K 7/006; H02K 5/10; H02K 7/12; H02K 11/0094; H02K 21/22; H02K 11/24; H02K 1/2786; H02K 11/30; H02K 7/14; H02K 2211/03
See application file for complete search history.

(56) References Cited

U.S. PATENT DOCUMENTS

| | | | | |
|---|---|---|---|---|
| 4,019,782 A * | 4/1977 | Reppert | ........... | B60B 21/06 301/58 |
| 5,795,036 A * | 8/1998 | Campagnolo | ....... | B60B 1/0261 301/59 |
| 6,617,746 B1 * | 9/2003 | Maslov | ............. | H02K 1/141 310/429 |
| 6,765,323 B2 * | 7/2004 | Takano | ............. | B60L 15/20 310/68 B |
| 6,787,951 B2 * | 9/2004 | Maslov | ............. | H02K 1/141 310/216.008 |
| 7,156,196 B2 * | 1/2007 | Katsaros | ........... | B62M 6/25 180/206.5 |
| 7,182,410 B2 * | 2/2007 | Fukui | ............... | B60B 7/00 301/108.5 |
| 7,273,259 B2 * | 9/2007 | Fukui | ............... | B60B 7/00 301/108.5 |
| 7,284,631 B2 * | 10/2007 | Rizzetto | ........... | B62M 6/55 180/206.4 |
| 7,370,720 B2 * | 5/2008 | Kokatsu | ........... | B62M 6/45 180/206.4 |
| 7,375,450 B2 * | 5/2008 | Tanaka | ............ | B62J 6/12 310/216.004 |
| 8,960,354 B2 * | 2/2015 | Lin | ................. | B62M 6/65 180/220 |
| 9,669,897 B2 * | 6/2017 | Zanfei | ............. | B62M 6/50 |
| 9,821,597 B2 * | 11/2017 | Koshiyama | .......... | B60B 1/042 |
| 9,925,826 B2 * | 3/2018 | Koshiyama | .......... | B60B 1/042 |
| 9,962,991 B2 * | 5/2018 | Koshiyama | .......... | B60B 1/042 |
| 10,500,950 B2 * | 12/2019 | Wu | .................. | B60B 3/08 |
| 2002/0156577 A1 | 10/2002 | Flick | | |
| 2003/0062782 A1 * | 4/2003 | Takano | ............. | B62M 6/45 310/75 B |
| 2004/0164624 A1 | 8/2004 | Suzuki et al. | | |
| 2007/0252452 A1 * | 11/2007 | Ishimoto | ........... | B60L 50/20 310/67 A |
| 2011/0133542 A1 * | 6/2011 | Ratti | ............... | B60B 1/042 301/6.5 |
| 2011/0304235 A1 | 12/2011 | Hashiba et al. | | |
| 2012/0161495 A1 * | 6/2012 | Ito | ................... | B60L 50/20 301/6.5 |
| 2012/0169154 A1 * | 7/2012 | Curodeau | ......... | B60L 50/20 310/43 |
| 2013/0049549 A1 * | 2/2013 | Folmli | ............. | B62M 23/02 310/67 A |
| 2013/0068549 A1 * | 3/2013 | Laprade | .......... | B62M 6/55 180/206.1 |
| 2013/0207448 A1 * | 8/2013 | Koshiyama | .......... | B60B 1/042 301/59 |
| 2014/0035347 A1 * | 2/2014 | Zanfei | ............. | B62M 11/16 301/6.5 |
| 2015/0239527 A1 | 8/2015 | Huang | | |
| 2016/0014252 A1 * | 1/2016 | Biderman | ......... | G05D 1/021 455/420 |
| 2016/0068223 A1 * | 3/2016 | Zanfei | ............. | B62M 6/50 301/6.5 |
| 2017/0297616 A1 | 10/2017 | Kikuchi et al. | | |
| 2019/0185106 A1 * | 6/2019 | Lin | ................... | H02K 7/12 |
| 2019/0202526 A1 * | 7/2019 | Lin | ................... | B60L 53/305 |
| 2019/0315241 A1 * | 10/2019 | Lin | ................... | H02K 21/22 |

FOREIGN PATENT DOCUMENTS

| | | | |
|---|---|---|---|
| KR | 10-2017-0106788 A | | 9/2017 |
| KR | 20170106788 A | | 9/2017 |
| WO | 2003097437 A1 | | 11/2003 |
| WO | 2012123802 A1 | | 9/2012 |

OTHER PUBLICATIONS

European Search Report for European Application No. 18209482.1; Applicant: Gogoro Inc., dated Feb. 26, 2019, 3 pages.

Office Action received for co-pending Japanese Application No. JP2018-224711; Applicant: Gogoro Inc., dated Nov. 26, 2019, 6 pages.

Non-Final Office Action received for co-pending U.S. Appl. No. 16/207,068, Applicant: Gogoro Inc., dated Mar. 20, 2020, 18 pages.

Indian Official Examination Report received for co-pending Indian Patent Application No. IN201814045103; Applicant; Gogoro Inc.; dated Aug. 1, 2020, 6 pages.

Korean Office Action received for copending Korean Patent Application No. KR10-2018-0152870; Applicant; Gogoro Inc.; dated Oct. 26, 2020, 4 pages.

* cited by examiner

HUB APPARATUS AND ASSOCIATED SYSTEMS

CROSS-REFERENCE TO RELATED APPLICATION

The present application claims the benefit of and priority to U.S. Provisional Applications No. 62/593,854, filed Dec. 1, 2017, and No. 62/650,895, filed Mar. 30, 2018, which are incorporated herein by reference in their entirety.

TECHNICAL FIELD

The present technology is directed to a hub apparatus and associated systems. More particularly, the present technology is directed to a hub apparatus included in a wheel and configured to drive the same.

BACKGROUND

In modern cities, transportation replying on personal vehicles can result in significant amount of traffic and pollution. One solution to this problem is to encourage people to use vehicles with a compact design, for example, a compact vehicle having a wheel driven by a hub apparatus. Some conventional hub apparatuses have complex designs and only support limited types of wheels. Some conventional hub apparatuses have durability and structure rigidity issues. Therefore, there is a need for an improved hub apparatuses and associated systems.

Figure 1:
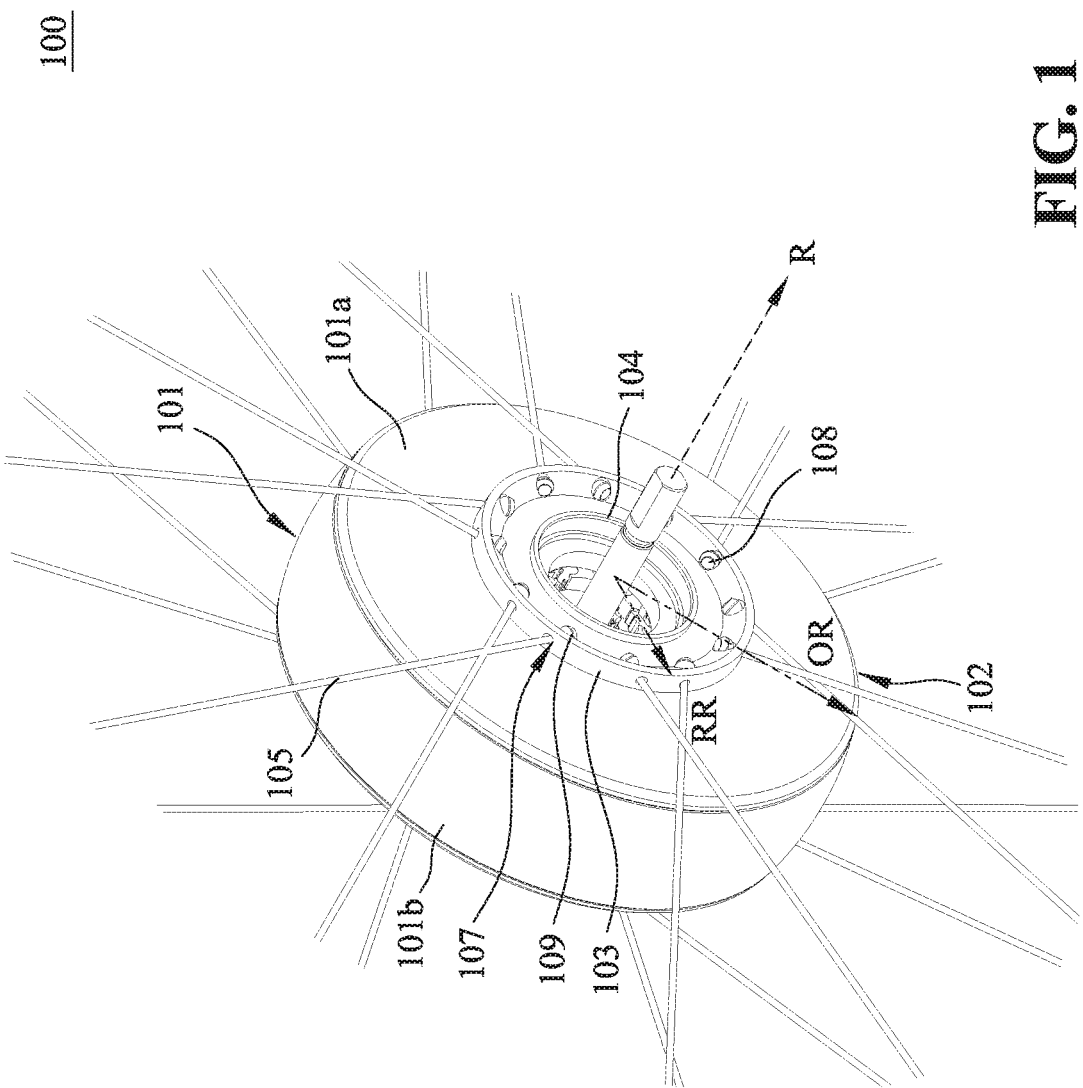
FIG. 1 illustrate a hub apparatus in accordance with embodiments of the present technology.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

The present technology is directed to a hub apparatus included in a wheel configured to drive a vehicle. The hub apparatus includes, for example, a housing assembly having an outer radius and a mounting portion circumferentially provided on at least one side surface of the housing assembly. The mounting portion is formed as a outwardly extending flange with a plurality of coupling structures (e.g., openings) around its circumference that are configured to couple the hub apparatus to a wheel rim (e.g., via spokes). For example, one end of the spoke is coupled to the mounting portion, whereas the other end of the spoke is coupled to the wheel rim. The mounting portion has a radius smaller than the outer radius of the housing assembly. In some embodiments, a ratio of the radius of the mounting portion to the outer radius (of the housing assembly) can be 30%, 40%, 50%, 60%, 70%, 80% to 90%, or can be any suitable percentage therebetween. By connecting the spokes with the mounting portion, rather than with an outer edge of the housing assembly, the ends of the spokes that contacts the mounting portion can be positioned at a location close to the center of housing assembly, which enhances structure rigidity and durability.

In some embodiments, the present technology is directed to a wheel having a tire, a wheel rim, and a hub apparatus. The wheel can be rotated by the hub apparatus so as to drive a vehicle (e.g., a bicycle, a tricycle, a scooter, a powered wheel chair, a cart, etc.). The wheel can include a connecting structure configured to couple the hub apparatus to a wheel rim. In some embodiments, the connecting structure includes (1) a plurality of modularized connectors (e.g., spokes and washers/bushings) and (2) a mounting portion (e.g., a hub flange, a ring structure, a toroid or "doughnut-shaped" structure, etc.) extending outwardly from a surface of the hub apparatus. In some embodiments, the housing assembly can include two housing components that are engaged with each other. When an excessive, external force is applied at the location where the two housing components are connected, the housing components can be disengaged or even damaged. With the connecting structure, the spokes are not directly coupled to an outer edge of the housing assembly of the hub apparatus, and accordingly the force/tension from the spokes does not substantially affect the housing assembly. As a result, the structural rigidity of the hub apparatus is enhanced, so as the stability of the hub apparatus during operation.

In some embodiments, the hub apparatus includes a rotor assembly, a shaft, and a stator assembly. The stator assembly is fixedly coupled to the shaft, and the shaft extends through the rotor assembly. The rotor assembly can be rotated relative to the stator assembly and the shaft. In some embodiments, the hub apparatus can be considered as an electric motor. The rotor assembly of the hub apparatus is coupled to the wheel/rim of the vehicle, and the shaft is fixedly coupled to the vehicle (e.g., a vehicular structure such as a frame). The hub apparatus is configured to rotate the wheel either with or without human power to move (or at least facilitate the movement of) the vehicle.

Advantages of the present technology include, for example, (1) it strengthens the rigidity and overall structural strength of the hub apparatus; (2) the force from the wheel can be evenly distributed onto the mounting portion (e.g., a spherical washer can be positioned against a spherical interior surface of the mounting portion, so as to increase the contact surface area between the mounting portion and the spokes); (3) it provides a connecting structure for effectively coupling a hub apparatus to a rim/wheel; and (4) the connecting structure includes modularized components with different sizes/shapes/dimensions suitable for coupling various types of hub apparatuses and rims/wheels. In some embodiments, the disclosed technology enables a user to customize the connecting structure based on one or more factors, such as, the locations/routes for operating the hub apparatus (e.g., in a city or a mountain, on a paved or gravel road, etc.), the environmental condition when operating the hub apparatus (e.g., temperature, humidity, air pollutants, etc.). This is beneficial for the connecting structure's life expectancies and reliabilities.

Another aspect of the present technology includes a wheel having (1) a tire; (2) a rim configured to support the tire; (3) a housing assembly having an outer radius; (4) a mounting portion circumferentially provided on at least one side surface of the housing assembly; and (5) a plurality of modularized connectors configured to couple the mounting portion to the rim. The mounting portion is formed with a plurality of coupling structures (e.g., openings) around its circumference that are configured to couple the housing assembly to the rim. The mounting portion defines a first radius smaller than the outer radius of the housing assembly. Each of the modularized connectors is positioned to cooperate with a corresponding one of the openings. Each of the modularized connectors has an outer end and an inner end. The outer end is coupled to the rim, and the inner end is configured to seat against an interior surface of the mounting portion.

In some embodiments, each of the plurality of modularized connectors has a spoke and a washer/bushing, and the spoke is formed with a stopping portion at an end (e.g., a flared end where the diameter of the spoke increases). The washer is fitted over one of the plurality of modularized connectors, and the washer rests against the inner end of the one of the plurality of modularized connectors. In some embodiments, each of the plurality of modularized connectors can have a spherical stopping portion at its inner end (e.g., close to the center of the hub apparatus), configured to be positioned in an interior spherical surface of a corresponding one of the coupling structures. In some embodiments, the coupling structures can be in different forms based on the characteristics of the connecting structure. For example, the hub apparatus can be coupled to the wheel with screws/bolts/nuts or any other suitable connecting structures.

Yet another aspect of the present technology includes a wheel having (1) a tire; (2) a rim configured to support the tire; (3) a housing assembly having an outer radius; (4) a first mounting portion circumferentially provided on a first surface of the housing assembly; (5) a second mounting portion circumferentially provided on a second surface of the housing assembly opposite the first surface; and (6) a plurality of modularized connectors configured to couple the first and second mounting portions to the rim. The first mounting portion is formed with a plurality of first openings configured to couple the housing assembly to the rim. The first mounting portion defines a first radius smaller than the outer radius. The second mounting portion is formed with a plurality of second openings configured to couple the housing assembly to the vehicle. The second mounting portion defines a second radius smaller than the outer radius. In some embodiments, the second radius is generally the same as the first radius. In some embodiments, the second radius is different from the first radius. In some embodiments, a ratio of the first radius to the outer radius is smaller than 70 percent. In some embodiments, the ratio can range from 30% to 90%.

Figure 2A:
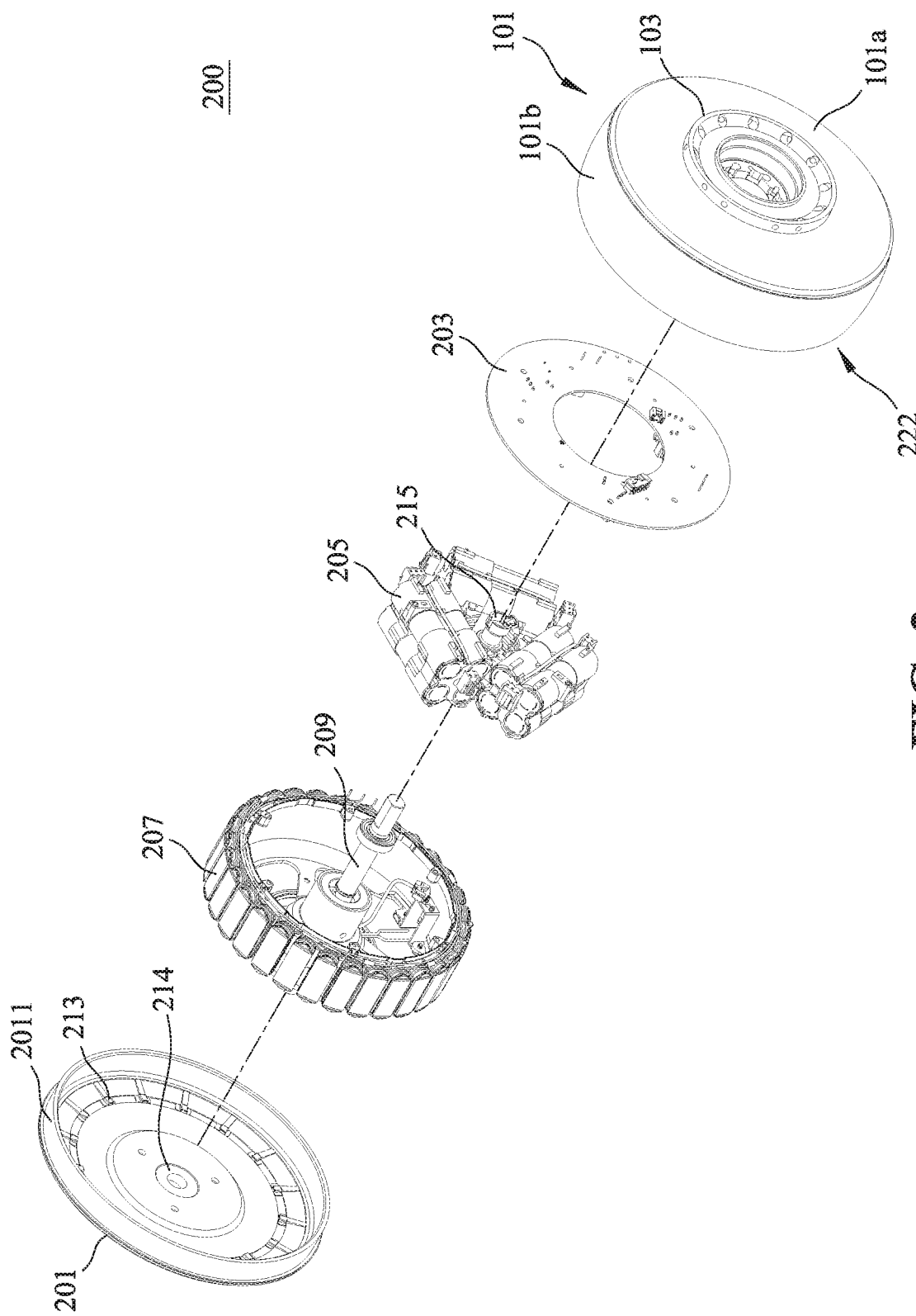
FIGS. 2a and 2b are partially exploded views illustrating a hub apparatus in accordance with embodiments of the present technology.

FIG. 1 is an isometric view of a hub apparatus/assembly 100 in accordance with embodiments of the present technology. As shown in FIG. 1, the hub apparatus 100 includes a housing (or an outer housing) and a mounting portion 103 configured to accommodate multiple modularized connectors or spokes 105 (e.g., the other end of the spoke 105 can be coupled to a front/back wheel of a bike). The housing includes a first housing component 101 and a second housing component 201 (FIG. 2a). In some embodiments, the mounting portion 103 can be a hub flange (e.g., a structure having a circular, flat sidewall) or a ring structure (e.g., a structure having a circular, curved sidewall). In some embodiments, the mounting portion 103 can be a toroid structure. In some embodiments, the mounting portion 103 can be integrally formed with a sidewall of the first housing component 101. In some embodiments, the mounting portion 103 can be secured or fixedly attached to the sidewall of the first housing component 101.

As shown in FIG. 1, the first housing component 101 defines an outer radius OR. The outer radius extends from the center of the first housing component 101 to an outer edge 102. The mounting portion 103 has a radius RR smaller than the outer radius OR. The first housing component 101 is formed with a side opening (e.g., for a shaft to pass through). The side opening defines an inner edge 104. As shown, the mounting portion 103 is positioned outside the center opening.

In some embodiments, the housing can be assembled from multiple housing components. The first housing component 101 and the second housing component 201 are coupled to each other and together form an inner/interior/internal space to accommodate elements of the hub apparatus 100. In some embodiments, for example, the first housing component 101 can include a sidewall 101a and an outer rim 101b extending around the outer circumference of the sidewall 101a. The outer rim 101b has a height that defines the interior space in the housing. As shown, the outer rim 101b is circumferentially positioned around an outer edge of the sidewall 101a.

As shown in FIG. 1, the first housing component 101 is formed with a side opening in its center, allowing a shaft (e.g., shaft 209 in FIG. 2a) to pass through. The side opening is configured to accommodate a side cover 404 (see FIG. 4). In some embodiments, the side cover 404 is fixedly coupled to the shaft and accordingly does not rotate with the housing. In some embodiments, a bearing can be positioned between the side cover and the housing, which enables the housing to rotate relative to the side cover 404 (or shaft 209). In some embodiments, an oil seal can be positioned between the housing and the side cover.

As shown in FIG. 1, the mounting portion 103 is coupled to, or integrally formed with, the sidewall 101a. The mounting portion 103 extends outwardly from a surface of the sidewall 101a at a position radially outward from a center point of the first housing component 101. A second housing component 201 (e.g., a lid or cap; FIG. 2a) encloses the open end of the first housing component 101 with a structure that fits underneath the outer rim 101b of the first housing component 101. In some embodiments, the second housing component 201 can include an insertion flange 2011 formed thereon. The insertion flange (or lip) 2011 is configured to couple the second housing component 201 to the first housing component 101 (e.g., to be inserted into a gap, to be discussed below with reference to FIG. 2b). In some embodiments, the insertion flange 2011 is configured to be tightly fitted with the outer rim 101b. In some embodiments, a bearing or oil seal 214 (FIG. 2a) can be positioned between the second housing component 201 and the shaft 209. The bearing 214 is configured to facilitate the relative rotation between the second housing component 201 and the shaft 209.

As best shown in FIG. 2a, fitted into the interior space of the housing are a main circuit board 203, a battery assembly 205, and a stator assembly 207 that are fixed directly or indirectly to an axle or shaft 209 passing through the center of the hub assembly 100. In such embodiments, the first housing component 101 and a number of magnets 208 (not visible in FIG. 1; see FIG. 2b) on the interior of the first housing component 101 together form a rotor assembly 222. In some embodiments, the main circuit board 203 and the battery assembly 205 can be considered part of the stator assembly 207.

Figure 2B:
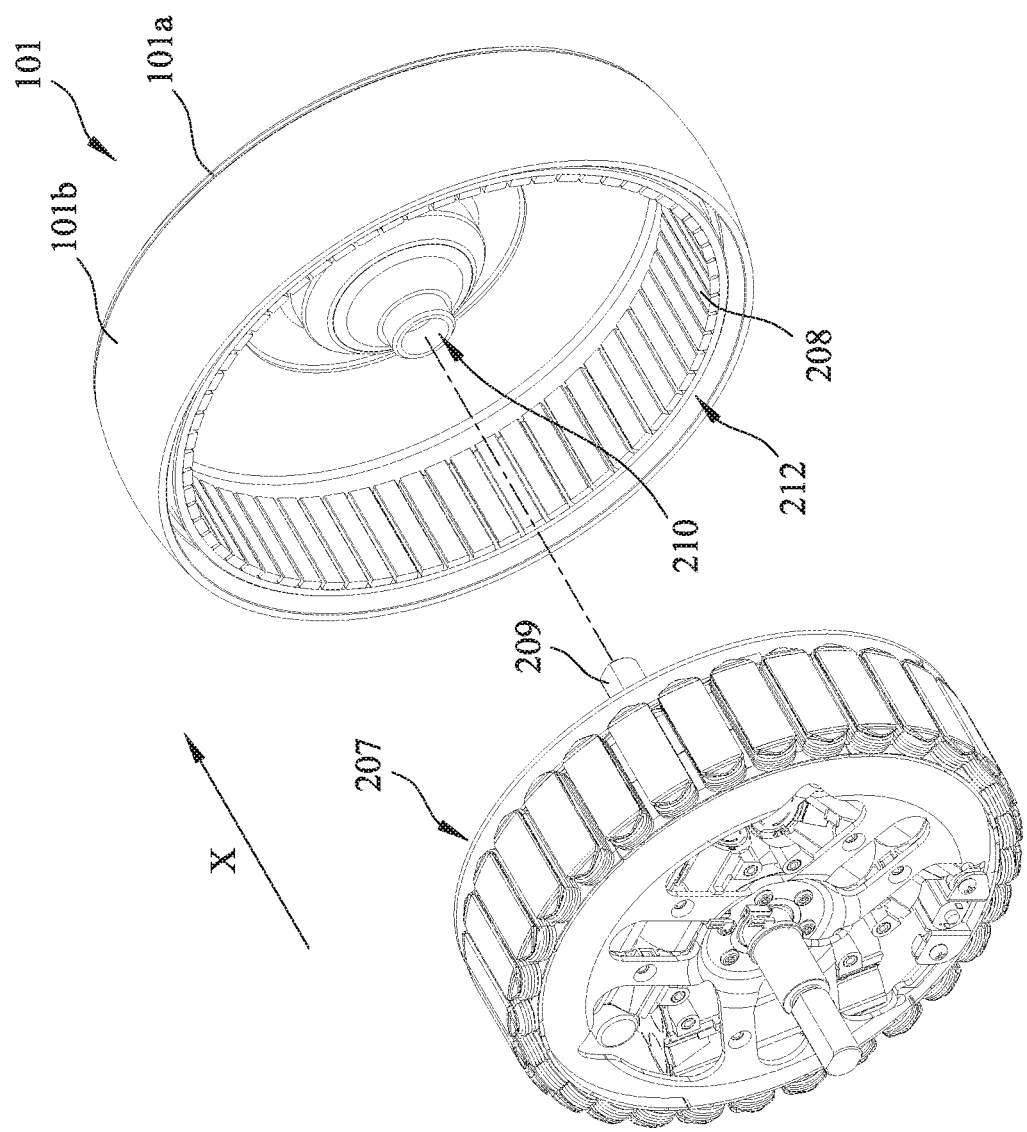

As best shown in FIG. 2b, the stator assembly 207 includes a support wheel/chassis/structure having a number of coils positioned around its outer circumference. The support wheel is hollow so that the battery assembly 205 and other electronic components of the hub apparatus 200 can fit into an interior space of the support wheel. When an electric current provided by battery packs of the battery assembly 205 passes through coils (or coil assembly) of the stator assembly 207, magnetic fields are generated and accordingly move the magnets of the rotor assembly to rotate the rotor assembly 222 about axis R (or shaft 209). In some embodiments, an additional battery pack can be positioned external to the hub apparatus 100 as a backup, supplementary power supply. As a result, the housing and a wheel attached to the housing via the spokes 105 are also rotated to move a scooter, a bicycle, or a vehicle.

In the illustrated embodiment, the mounting portion 103 and the sidewall 101a are concentrically positioned. The mounting portion 103 is positioned around a center point of the sidewall 101a. In other embodiments, the mounting portion 103 can have a radius that is closer to the outer edge of the first housing component 101 or nearer to the center point). As shown, the mounting portion 103 includes a plurality of coupling structures such as openings 107 each configured to receive the end of a corresponding one of the spokes 105, respectively. In some embodiments, the opening 107 can be in various shapes such as circular, oval, ellipse, etc. In some embodiments, the coupling structures can be any structures suitable for connecting the hub apparatus 100 to a wheel. In some embodiments, for example, the modularized connectors can include a screw, and the coupling structures can include a tapped hole.

Each spoke 105 has an outer end configured to couple to a wheel/rim structure (not shown in FIG. 1) and an inner, flared (or spherical) end 109 that seats against a correspondingly shaped recess formed in an interior circumference of the mounting portion 103. In one embodiment, a spherical washer/bushing 108 is fitted over the spoke 105 and rests against the flared end of the spoke 105. In some embodiments, the washer/bushing 108 can have a conical recess therein that fits to the profile of the placed end of the spoke 105. Correspondingly shaped spherical recesses are formed in the mounting portion 103 to receive the spherical washer 108 and seat the spoke 105 under tension. In some embodiments, each of the openings 107 includes an interior spherical surface configured to receive the spherical washer 108. In some embodiments, the openings 107 are arranged around the mounting portion 103 with equal intervals between adjacent two of the openings 107. In some embodiments, the spacing of the openings 107 is not uniform, depending on the desired lacing patterns of the spokes 105.

In addition, because the spherical washer 108 allows the spoke 105 to be in contact with the mounting portion 103 at various angles, the present structure (1) improves manufacturing flexibility (e.g., they are easy to fit and have a higher error tolerance) and (2) provides additional durability when operating the hub apparatus 100 at least because the spokes 105 are not rigidly secured to the hub flange 103 at their ends. Also, the force/tension can be evenly distributed due to the spherical contact surfaces (rather than a single contacting point), especially when all the spokes 105 are connected in different direction/angles.

FIG. 2a is an exploded view showing a hub apparatus 200 in accordance with embodiments of the present technology. The hub apparatus 200 includes the first housing component 101 (which has the sidewall 101a and the outer rim 101b) and the second housing component 201. On its outer surface, the first housing component 101 includes the mounting portion 103 configured to couple the first housing component 101 to a wheel/rim structure via multiple spokes. On its inner surface, the second housing component 201 includes multiple protrusions or stopping bumps 213 configured to stop the relative rotation (e.g., by cooperating with a locking device (e.g., a stopper that is moveable toward the first housing component 101)) between the first housing component 101 and the stator assembly 207. The multiple protrusions or stopping bumps 213 can be named as "engaging portions." Together, the first housing component 101 and the second housing component 201 form a housing assembly.

In some embodiments, the engaging portion can be implemented as a recess (e.g., configured to receive the locking device), a hook (e.g., configured to engage the locking device), and other suitable components. In some embodiments, the engaging portions are located on the interior surface of the sidewall 101a of the first housing component 101, and/or on the interior surface of the second housing component 201.

In the illustrated embodiment, multiple magnets 208 (see FIG. 2b) are circumferentially positioned on the inner surface of the outer rim 101b, and accordingly the first housing component 101, the second housing component 201, and the magnets together act as a "rotor assembly" or a rotor in this embodiment.

The main circuit board 203 is configured to carry one or more controllers, controlling circuits, logic, sensors, wiring, and/or other suitable components necessary to apply current to the coils or to rotate the housing. In some embodiments, the main circuit board 203 can carry an engine/electrical control unit (ECU) of a vehicle. In some embodiments, the main circuit board 203 can carry a power transmission (PT) component (not shown) configured to control the power output of the hub apparatus 200. The power output can be measured in form of the torque force of rotation between the rotor assembly (the housing with the magnets 208 positioned therein or on its inner surface) and the stator assembly 207 or by the watts expended by the motor. In some embodiments, the main circuit board 203 can carry drive circuitry configured to manage the power from the battery assembly 205 (e.g., to supply a three-phase alternating current). In some embodiments, the power transmission component can be part of the drive circuitry.

The battery assembly 205 can include multiple battery packs. In the illustrated embodiments, the battery assembly 205 includes three battery packs laterally positioned adjacent to the main circuit board 203. In other embodiments, the battery assembly 205 can have different numbers of battery packs arranged in various ways. In some embodiments, the battery assembly 205 can include multiple battery packs positioned to form a polygon (e.g., a triangle, a rectangle, a pentagon, a hexagon, etc.) in a reference plane generally perpendicular to the shaft 209 (e.g., in such embodiments, the longitudinal direction of the battery packs lies in the reference plane). In some embodiments, the battery pack can be positioned at equal angles around the shaft 209. In some embodiments, the battery packs can be arranged based on the size/shape of the battery packs. For example, the battery packs can have orientations different from those shown in FIG. 2a.

In some embodiments, the battery assembly 205 can be controlled or managed by a battery management system (BMS). The BMS can include one or more sensors configured to monitor the status of a battery. In some embodiments, the BMS can be positioned on the main circuit board 203. In some embodiments, the battery packs (and battery cells therein) can be connected in series or in parallel, depending on various needs or actual designs.

In some embodiments, the battery assembly 205 can be coupled to one or more battery memories positioned on the main circuit board 203 and configured to store battery-related information (e.g., battery usage information, battery operating instructions (such as charging/discharging rates or other instructions that may vary from different batteries), battery firmware, battery status, etc.). In some embodiments, the battery memory can also be configured to store vehicle information (e.g., an operating temperature in the hub apparatus 200, maintenance information, model number, serial number, etc.) or user information (e.g., driving/riding history, habits, etc.). In some embodiments, the battery memories can be positioned inside a battery housing of the battery assembly 205.

In some embodiments, the battery assembly 205 can be positioned inside (the support wheel of) the stator assembly 207 such that the hub apparatus 200 can have a compact design. Benefits of positioning the battery assembly 205 inside the stator assembly 207 include, for example, (1) the stator assembly 207 can protect the battery assembly 205, for example, from impacts from the outside; and (2) this arrangement can at least partially prevent the battery assembly 205 from interference/influence of the magnetic fields generated by the magnets 208 of the rotor assembly and/or by the coils of the stator assembly 207.

The axle or shaft 209 is fixedly coupled to the main circuit board 203, the battery assembly 205, and the stator assembly 207. The shaft 209 can be coupled to a vehicular body (e.g., a frame, a chassis, structural parts, etc.) and support the same. During operation, the housing and the wheel attached thereto (via the spokes coupled to the hub flanges) can rotate relative to the shaft 209 to move the vehicular body. In some embodiments, the shaft 209 can be coupled to a front wheel component (e.g., a front wheel fork) or a rear wheel component (e.g., a rear wheel frame).

In some embodiments, the hub apparatus 200 can include one or more waterproof components (e.g., O-rings) configured to make the hub apparatus 200 waterproof. In some embodiments, the waterproof component can be positioned at one or more locations such as a location adjacent to the shaft 209, a location adjacent to a component (e.g., a torque sensor) of the hub apparatus 200, etc. In some embodiments, the waterproof component can also be positioned between the first housing component 101 and the second housing component 201, at one or both ends of the shaft 209, between the side cover 404 and the first housing component 101 and the second housing component 201, etc. so as to enhance the overall waterproof capability of the hub apparatus 200. In some embodiments, the shaft 209 can be coupled to a torque sensor jacket configured to protect a torque sensor and/or to facilitate the installation of the torque sensor.

FIG. 2b illustrates how the stator assembly 207 is fitted within the first housing component 101. As shown, the stator assembly 207 is coupled to the shaft 209 which passes through a center opening 210 of the first housing component 101 (in direction X, as indicated). As shown, multiple permanent magnets 208 are positioned on the interior or inner surface of the first housing component 101. During operation, the multiple permanent magnets 208 and the first housing component 101 can rotate (as a rotor assembly, along with the second housing component 201) relative to the stator assembly 207.

In some embodiments, the magnets 208 can be coupled to the first housing component 101 via a connecting structure (e.g., a metal ring). In some embodiments, the magnets 208 can be coupled to or embedded into, the sidewall 101a of the first housing component 101. In some embodiments, the magnets 208 can be coupled to the outer rim 101b of the first housing component 101.

As shown in FIG. 2a, a gap 212 is formed between an edge of the magnets 208 and the first housing component 101. The gap 212 is configured to receive the insertion flange 2011 of the second housing component 201 (FIG. 2b), such that the second housing component 201 and the first housing component 101 are fixedly coupled.

Figure 3B:
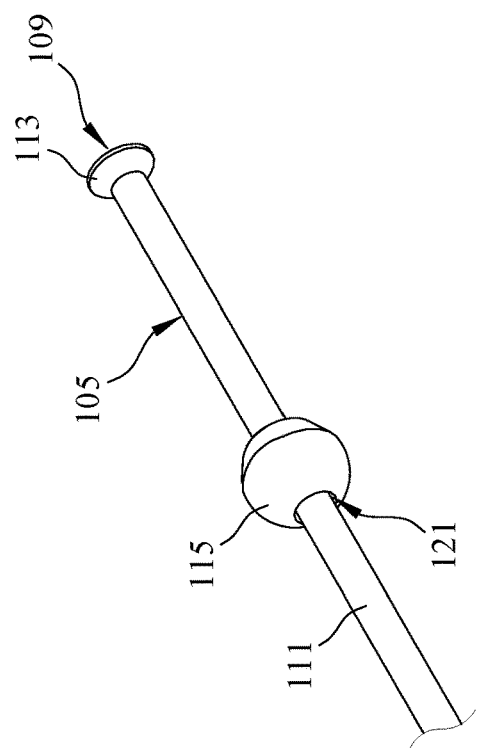
FIGS. 3a and 3b illustrate spokes and washers/bushings in accordance with embodiments of the present technology.
Figure 3A:
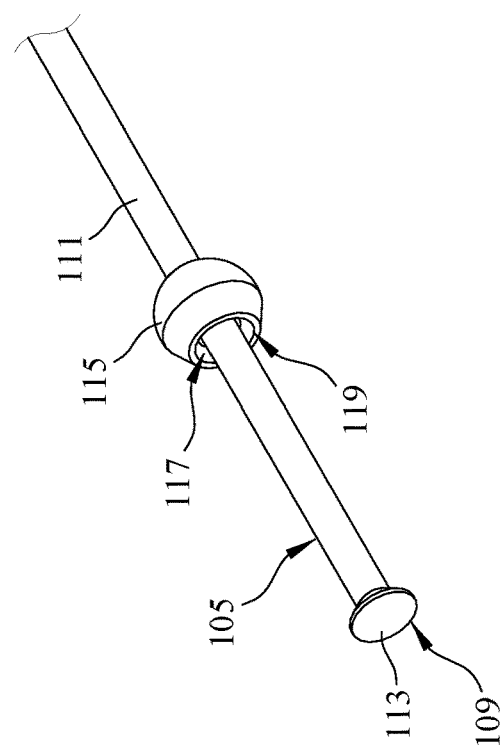

FIGS. 3a and 3b are isometric views of an embodiment of the spoke 105. As shown in FIGS. 3a and 3b, the spoke 105 includes an elongated central portion 111, a stopping portion 113 located at the flared end 109 of the spoke 105, and a hollow, partially-spherical washer 115. The partially-spherical washer 115 includes a through hole 117, which enables the elongated central portion 111 of the spoke 105 to pass though.

The partially-spherical washer 115 includes a first truncated opening (or a tapered counter bore sized to mate with at least a portion of the flared end of the spoke 105) 119 at one end of the through hole 117 and a second truncated opening (or counter bore) 121 at the other end of the through hole 117. As shown, the diameter of the first truncated opening 119 is greater than the diameter of the second truncated opening 121. As also shown, the diameter of the first truncated opening 119 is smaller than the diameter of the flared end 109 of the spoke 105. Accordingly, the flared end 109 fits partially in the partially-spherical washer 115 when the spoke 105 is secured in the wheel.

In some embodiments, the shape of the flared end 109 corresponds to the shape of the partially-spherical washer 115 (e.g., the shape of the second truncated counter bore 121), such that the flared end 109 and the partially-spherical washer 115 can be securely, fittingly coupled. The corresponding shapes of the flared end 109 and the partially-spherical washer 115 provide sufficient contacting surface therebetween.

Figure 4:
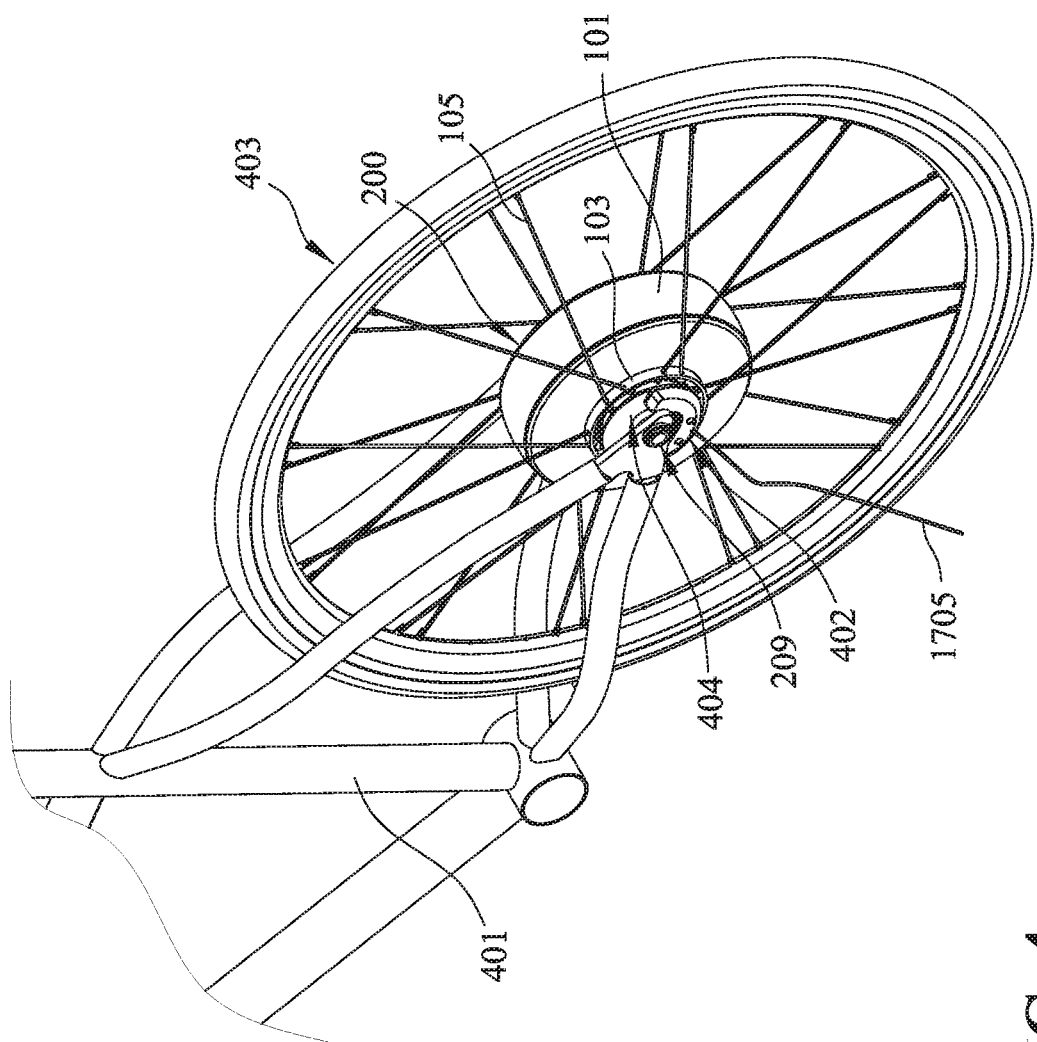
FIG. 4 illustrates a wheel with a hub apparatus in accordance with embodiments of the present technology.

FIG. 4 is an isometric view of a vehicular frame 401 supporting the hub apparatus 200 and a charging head 402 in accordance with embodiments of the present technology. As shown, the shaft 209 of the hub apparatus 200 is fixedly coupled to the vehicular frame 401. The side cover 404 is fixedly coupled to the shaft 209 and accordingly does not rotate with the hub apparatus 200. The hub apparatus 200 is coupled to a wheel 403 via the spokes 105 and the mounting portion 103. The wheel 403 can be rotated by the hub apparatus 200 to move the vehicular frame 401. When the wheel 403 is not rotating, the charging head 402 can be coupled to the hub apparatus 200 and charge the battery assembly 205 in the hub apparatus 200. In some embodiments, the charging head 402 can be coupled to the hub apparatus 200 by a magnetic force. As shown, the charging head 402 can be coupled to a power source via a wire 405.

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A hub apparatus for driving a vehicle, the hub apparatus comprising:
   a housing assembly having an outer radius, the housing assembly comprising
      a first housing component; and
      a second housing component configured to be tightly fitted with the first housing component; and
   a mounting portion circumferentially provided on at least one side surface of the housing assembly, the mounting portion being formed with a plurality of coupling structures configured to couple the hub apparatus to a wheel rim, the mounting portion defining a first radius smaller than the outer radius;
   wherein the coupling structures comprise openings having an interior spherical surface configured to receive a spherical washer.

2. The hub apparatus of claim 1, wherein the housing assembly is formed with a shaft opening at a center of the hub apparatus, and wherein the shaft opening is configured to receive a shaft of the hub apparatus, and wherein the housing assembly is configured to rotatably couple to the shaft of the hub apparatus.

3. The hub apparatus of claim 1, wherein the mounting portion is concentric with the housing assembly.

4. The hub apparatus of claim 1, wherein the mounting portion comprises a hub flange integrally formed with the housing assembly.

5. The hub apparatus of claim 1, wherein the openings are circumferentially formed around the mounting portion.

6. The hub apparatus of claim 5, wherein the openings are arranged around the mounting portions with equal intervals between every adjacent two of the openings.

7. The hub apparatus of claim 1, wherein a ratio of the first radius to the outer radius is smaller than seventy percent.

8. The hub apparatus of claim 1, wherein the mounting portion is a first mounting portion, and wherein the at least one side surface is a first surface, and wherein the hub apparatus further comprises a second mounting portion provided on a second surface opposite to the first surface, and wherein the second mounting portion has a second radius substantially the same as the first radius.

9. The hub apparatus of claim 1, wherein the mounting portion is a first mounting portion, and wherein the at least one side surface is a first surface, and wherein the hub apparatus further comprises a second mounting portion provided on a second surface opposite to the first surface, and wherein the second mounting portion has a second radius smaller than the outer radius and different from the first radius.

10. The hub apparatus of claim 1, wherein the mounting portion comprises a toroid structure attached to the first housing component.

11. The hub apparatus of claim 1, wherein the first housing component comprises a sidewall and an outer rim, and wherein the outer rim is circumferentially positioned around an outer edge of the sidewall, and wherein the second housing component comprises a lid having an insertion flange configured to be tightly fitted with the outer rim.

12. A wheel, comprising:
   a tire;
   a rim configured to support the tire;
   a housing assembly having an outer radius, the housing assembly comprising
      a first housing component; and
      a second housing component configured to be tightly fitted with the first housing component; and
   a mounting portion circumferentially provided on at least one side surface of the housing assembly, the mounting portion being formed with a plurality of coupling structures configured to couple the housing assembly to a vehicle, the mounting portion defining a first radius smaller than the outer radius; and
   a plurality of modularized connectors configured to couple the mounting portion to the rim, each of the modularized connectors being positioned to cooperate with a corresponding one of the coupling structures, each of the modularized connectors having an outer end and an inner end, the outer end being coupled to the rim, the inner end being configured to seat against an interior surface of the mounting portion wherein the inner end comprises a flared end.

13. The wheel of claim 12, wherein each of the plurality of modularized connectors comprises a spoke, and wherein the spoke is formed with a stopping portion at the inner end.

14. The wheel of claim 13, wherein each of the plurality of modularized connectors further comprises a washer, and wherein the washer is fitted over the spoke, and wherein the washer is configured to rest against the stopping portion of the spoke and the interior surface of the mounting portion.

15. The wheel of claim 14, wherein the washer is a spherical washer, and wherein the coupling structures are openings, and wherein each of the openings has an interior spherical surface configured to receive the spherical washer.

16. The wheel of claim 12, wherein the inner end of each of the plurality of modularized connectors comprises a spherical stopping portion, and wherein the coupling structures are openings, and wherein each of the openings has an interior spherical surface configured to receive the spherical stopping portion.

17. A wheel, comprising:
   a tire;
   a rim configured to support the tire;
   a housing assembly having an outer radius, the housing assembly comprising
      a first housing component; and
      a second housing component configured to be tightly fitted with the first housing component; and
   a first mounting portion circumferentially provided on a first surface of the housing assembly, the first mounting portion being formed with a plurality of first openings configured to couple the housing assembly to a vehicle, the first mounting portion defining a first radius smaller than the outer radius;
   a second mounting portion circumferentially provided on a second surface of the housing assembly opposite to the first surface, the second mounting portion being formed with a plurality of second openings configured to couple the housing assembly to the vehicle, the second mounting portion defining a second radius smaller than the outer radius; and
   a plurality of modularized connectors configured to couple the first and second mounting portions to the rim, each of the modularized connectors being positioned to cooperate with a corresponding one of the first and second openings, each of the modularized connectors having an outer end and an inner end, each of the modularized connectors having a spherical washer at the inner end, the outer end being coupled to the rim, the inner end being configured to seat against an interior spherical surface of the first and second mounting portions.

18. The wheel of claim 17, wherein a ratio of the first radius to the outer radius is smaller than seventy percent, and wherein the second radius is substantially the same as the first radius.

* * * * *